Figure 1:
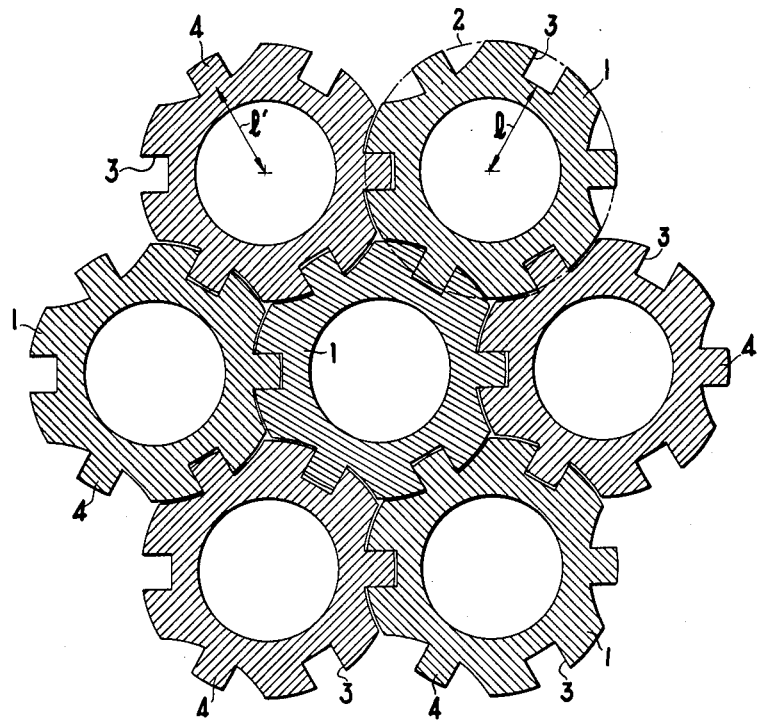

Oct. 13, 1964 G. LEMESLE ETAL 3,152,965
SOLID MODERATOR STACK FOR NUCLEAR REACTORS
Filed Nov. 2, 1962 2 Sheets-Sheet 1

INVENTORS
GEORGES LEMESLE
ROGER MANES
PIERRE ROUGE
BY Bacon & Thomas ATTORNEYS

United States Patent Office 3,152,965
Patented Oct. 13, 1964

3,152,965
SOLID MODERATOR STACK FOR NUCLEAR REACTORS
Georges Lemesle and Roger Manès, Paris, and Pierre Rougé, Gif-sur-Yvette, France, assignors to Commissariat a l'Energie Atomique, Paris, France
Filed Nov. 2, 1962, Ser. No. 234,995
Claims priority, application France, Nov. 20, 1961, 879,496, Patent 1,313,894
2 Claims. (Cl. 176—84)

The present invention relates to stacks of solid-moderator rods for nuclear reactors and especially concerns certain improvements in the design of elements which effect a coupling between the various rods in the construction of stacks of this type.

There has already been described and illustrated, especially in the American patent application No. 846,080, filed on Oct. 13, 1959, in the name of Commissariat a l'Energie Atomique, a type of moderator stack composed of vertical columns which are arranged side by side with a small degree of clearance and which are formed as a result of the super-position of prismatic rods, the coupling between the rods of the various columns being effected by means of parallelepipedal keys fitted in radially directed, longitudinal grooves formed in the lateral faces of the said rods. In accordance with an alternative form of embodiment, the lateral faces are provided either with grooves or raised ribs arranged in alternate sequence on each face in such manner as to ensure that adjacent rods are coupled together by virtue of the appropriate interpenetration of said ribs in the corresponding grooves.

While the above arrangement provides many advantages as regards the stability of the stack inasmuch as each column admits of little movement either axially and transversely with respect to the columns which surround it, such an arrangement nevertheless makes it necessary, in order to obtain ribs of suitable thickness, to machine each rod from a cylinder of larger diameter than that of the cylinder which passes through the longitudinal ridges of the machined prismatic rod.

Moreover, in the general case in which the moderator rods are provided with central channels, the aforesaid arrangement produces a weakening of the rods, especially in the region of the grooves inasmuch as the distance between the bottom of each groove and the axis of the rod is appreciably smaller than the distance between the axis and the base of each rib.

The object of the present invention is to overcome these disadvantages by virtue of a simple arrangement which makes it possible to achieve an economy of moderator material while at the same time endowing each rod of the stack with greater strength.

To this end, the invention mainly consists in a stack formed of identical prismatic rods having lateral faces which are provided successively with a rib then a groove by means of which the coupling of said lateral faces with adjacent rods is effected as a result of the engagement of the ribs in the corresponding grooves, in forming said ribs and said grooves in such manner that in each rod, the distance between the longitudinal axis of said rod and the bottom of each groove is equal to the distance between said longitudinal axis and the base of each rib.

In accordance with a first form of embodiment, the lateral faces of the prismatic rods have a general shape which is respectively concave or convex depending on whether said lateral faces are provided with either a rib or a groove.

In accordance with another form of embodiment, the lateral faces of the rods have a generally flat shape and are provided with splined portions which are respectively hollowed-out or raised depending on whether said lateral faces are provided with a rib or a groove.

The two forms of embodiment referred to above are clearly illustrated in the figures of the accompanying drawings, which are given solely by way of non-limitative example.

FIG. 1 shows a top view of a stack made up of moderator rods constructed in accordance with the invention. The rods 1 are machined from cylinders such as the cylinder 2 (as illustrated in chain-dotted lines in the figure) which pass through the longitudinal ridges of the rods. The lateral faces of said rods have a curvilineal profile and are provided in alternate sequence with a groove 3 then a rib 4 which are intended to fit into each other from one rod to an adjacent rod. The distance $l$ which exists between the axis of one rod and the bottom of a groove of this latter is equal to the distance $l'$ between the axis and the base of a rib.

Figure 2:
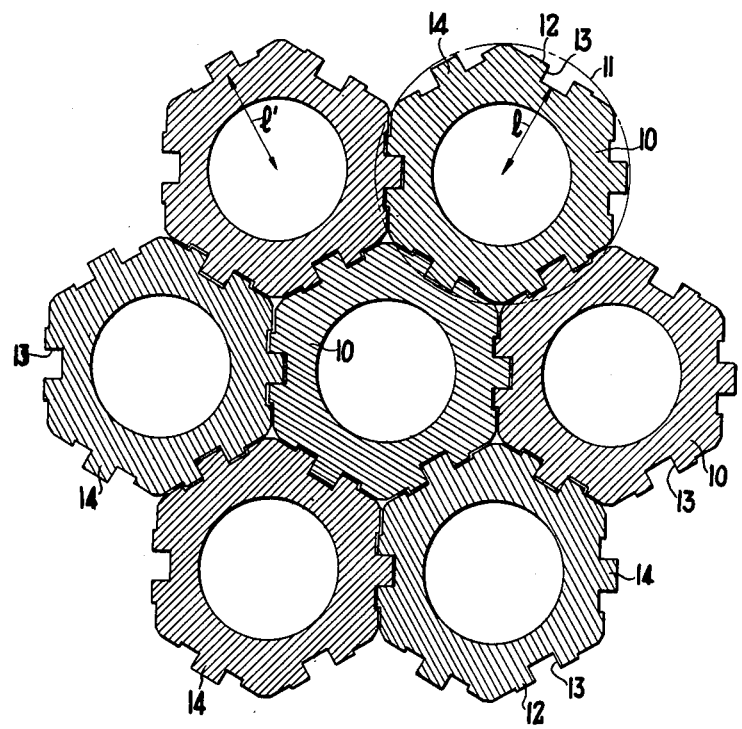

FIG. 2 illustrates a second form of embodiment in which the rods 10 are obtained from the cylinder 11 which passes, as in the previous example, through the longitudinal ridges. The lateral faces are flat and are provided with splined portions 12 which are either raised or hollowed in the place at which the grooves 13 and the ribs 14 are formed, these latter being so defined that the distance considered respectively from the bottom of each groove and from the base of each rib to the axis of the corresponding rod is identical.

The construction of a moderator stack in which use is made of rods in accordance with one of the types mentioned above clearly brings into evidence the advantages set forth above. In particular, it will be noted that the clearances which result from the machining of each rod entail only a minimal reduction of the volume of each corresponding cylinder, which accordingly results in an overall cost price of the stack which is appreciably lower than that of conventional stacks. Similarly, in addition to the increased strength of each rod in consequence of the fact that the depth of the grooves does not introduce any reduction in the thickness of material provided between the central channel and the bottom of each groove, it is useful to note the advantage which is gained as a result of the adoption of splined portions or curvilineal profiles for the lateral faces of the rods. In fact, the reduction of the free spaces between the columns which results therefrom produces a corresponding reduction in possible neutron escape in the transverse direction by substituting staggered paths for rectilineal paths through the moderator material.

It will be understood that the invention is not limited in any sense to the forms of embodiment which have been described and illustrated and which have been given solely by way of example.

What we claim is:
1. A solid-moderator stack for nuclear reactors, said stack being formed of identical prismatic rods, the lateral faces of which are provided successively with alternate ribs and grooves, by means of which the coupling of said lateral faces with adjacent rods is effected as a result of the engagement of the ribs in the corresponding grooves, characterized in that in each rod, the ribs and grooves are defined in such manner that the distance between the longitudinal axis of the rod and the bottom of each groove is equal to the distance between said longitudinal axis and the base of each rib, said lateral faces of the prismatic rods having a curvilinear profile and being respectively concave when provided with a rib and convex when provided with a groove.

2. A solid-moderator stack for nuclear reactors, said stack being formed of identical prismatic rods, the lateral faces of which are provided successively with alternate ribs and grooves by means of which the coupling of said lateral faces with adjacent rods is effected as a result of the engagement of the ribs in the corresponding grooves, characterized in that in each rod, the ribs and grooves are defined in such manner that the distance between said longitudinal axis of the rod and the bottom of each groove is equal to the distance between said longitudinal axis and the base of each rib, said lateral faces of the prismatic rods being flat and being provided with splined portions which are respectively recessed when provided with a rib and raised when provided with a groove.

References Cited in the file of this patent

UNITED STATES PATENTS

| | | |
|---|---|---|
| 2,863,815 | Moore et al. | Dec. 9, 1958 |
| 2,907,706 | Horning et al. | Oct. 6, 1959 |
| 3,076,753 | Bell | Feb. 5, 1963 |

FOREIGN PATENTS

| | | |
|---|---|---|
| 1,193,302 | France | Apr. 27, 1959 |
| 1,214,246 | France | Nov. 9, 1959 |